No. 857,144. PATENTED JUNE 18, 1907.
E. T. ALBER.
ANTIFRICTION GEAR TOOTH.
APPLICATION FILED DEC. 20, 1906.
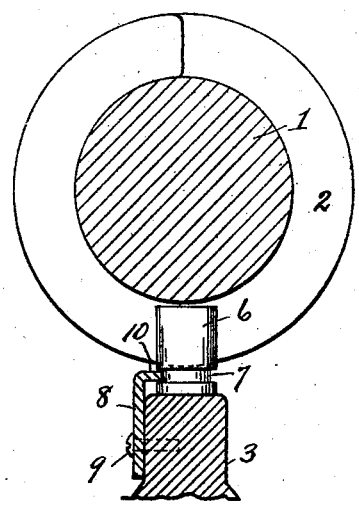
Fig. 2.
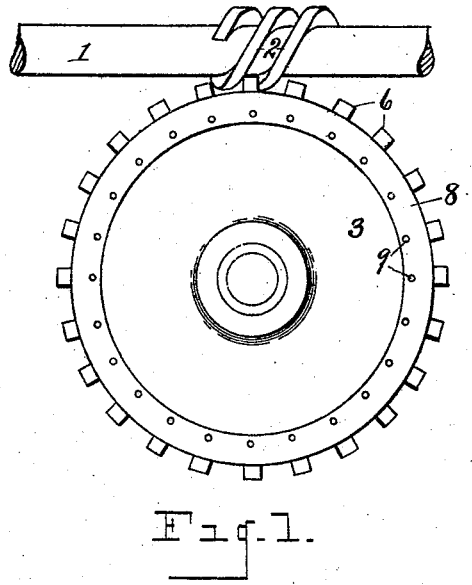
Fig. 1.
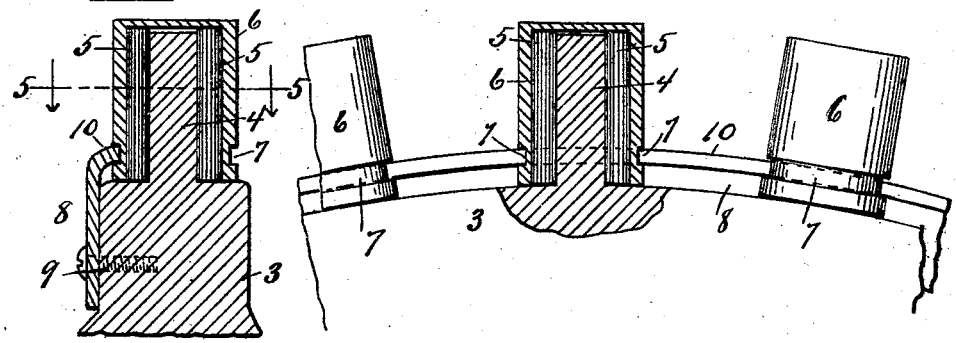
Fig. 4.
Fig. 3.
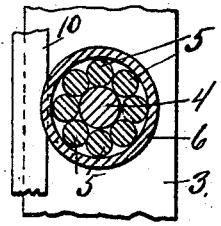
Fig. 5.
Witnesses
Inventor
Erhard T. Alber.
By Wheeler & Co. Attys.

UNITED STATES PATENT OFFICE.

ERHARD T. ALBER, OF ANN ARBOR, MICHIGAN.

ANTIFRICTION GEAR-TOOTH.

No. 857,144.  Specification of Letters Patent.  Patented June 18, 1907.

Application filed December 20, 1906. Serial No. 348,696.

*To all whom it may concern:*

Be it known that I, ERHARD T. ALBER, a citizen of the United States, residing at Ann Arbor, in the county of Washtenaw, State of Michigan, have invented certain new and useful Improvements in Antifriction Gear-Teeth; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to antifriction gear teeth, especially designed for use in connection with worm gearing, and consists in the construction and arrangement of parts hereinafter fully set forth and claimed.

The object of the invention is to provide a gear tooth for worm gearing of simple and inexpensive construction, wherein the arrangement is such as to obviate wear and reduce the friction to the minimum. The above object is attained by the structure illustrated in the accompanying drawings, in which:—

Figure 1 is an elevation of a gearing involving my invention. Fig. 2 is a fragmentary view showing a transverse section of the worm shaft, and a portion in section of the gear wheel. Fig. 3 is a fragmentary view showing a segment of the gear wheel and a sectional view of one of the teeth. Fig. 4 is a transverse section through one of the teeth and a portion of the periphery of the gear wheel. Fig. 5 is a horizontal section through one of the gear teeth as on line 5—5 of Fig. 4.

Referring to the characters of reference, 1 designates the worm shaft carrying the worm 2. The gear wheel 3 whose teeth are engaged by said worm, may be of any suitable construction and is provided with the peripheral journal pins 4. Surrounding each of said pins and lying in parallel contact therewith are the bearing rollers 5 which are held in place by an embracing rotatable cap 6 of cylindrical form seated over the rollers and pin and resting upon the periphery of the gear wheel.

Formed in the periphery of each of the caps near the base thereof is an annular channel 7. Secured to the side of the gear wheel at its perimeter is an annulus 8 which is made removable by means of the screws 9 and which is provided with an inwardly turned flange 10 that engages freely in the annular channel 7 of the caps whereby all of the caps are held in place to confine the rollers 5 in contact with the journal pins 4. By this arrangement the caps are permitted to rotate freely about the journal pins upon the antifriction rollers 5, yet are so held in place as to prevent cramping or binding upon said pins, whereby as the gear wheel is driven through the rotation of the worm, said caps rotate upon their roller bearings, thereby overcoming the rubbing friction which is commonly incident to the driving of a gear wheel by means of a worm. By removing the annulus, all of the caps are released enabling new caps to be readily supplied should it be found necessary. The annulus being common to all of the caps 6, said caps are secured in place with equal certainty when the annulus is in position upon the wheel.

Having thus fully set forth my invention, what I claim as new and desire to secure by Letters Patent, is:—

1. A gear wheel having teeth consisting of cylindrical pins, bearing rollers surrounding said pins and lying parallel therewith, rotatable caps embracing the rollers and pins, and means engaging said caps to retain them rotatably in place.

2. A gear wheel having teeth consisting of radial pins, bearing rollers surrounding said pins and lying parallel therewith, rotatable caps embracing said pins and rollers, each of said caps having a peripheral channel therein, an annulus secured to the side of the wheel having an inwardly turned flange lying in the channel of said caps.

3. A gear wheel having teeth consisting of rotatable caps, embracing bearing members, each of said caps having an annular channel in its periphery, an annulus removably attached to the side of the wheel and having an inwardly turned flange which engages freely in the channels of said caps.

In testimony whereof, I sign this specification in the presence of two witnesses.

ERHARD T. ALBER.

Witnesses:
 CONRAD NOLL,
 JOHN BAUMGARDNER.